R. A. WILLIAMS.
STOCK FEEDER.
APPLICATION FILED OCT. 3, 1911.
1,036,762.
Patented Aug. 27, 1912.
2 SHEETS—SHEET 1.
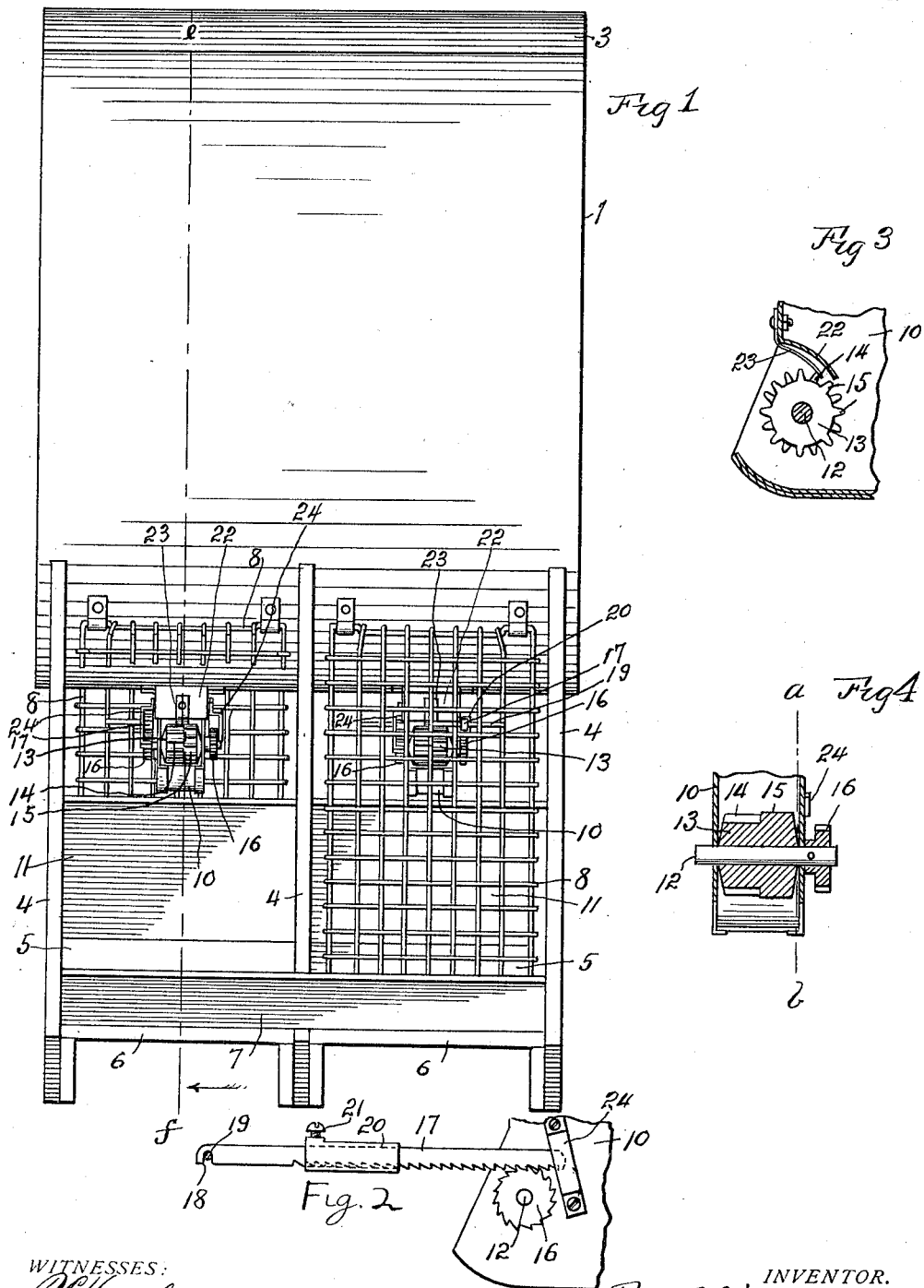
WITNESSES:
R. E. Hamilton
E. B. House
INVENTOR.
Ray A. Williams
BY Warren D. House
His ATTORNEY.

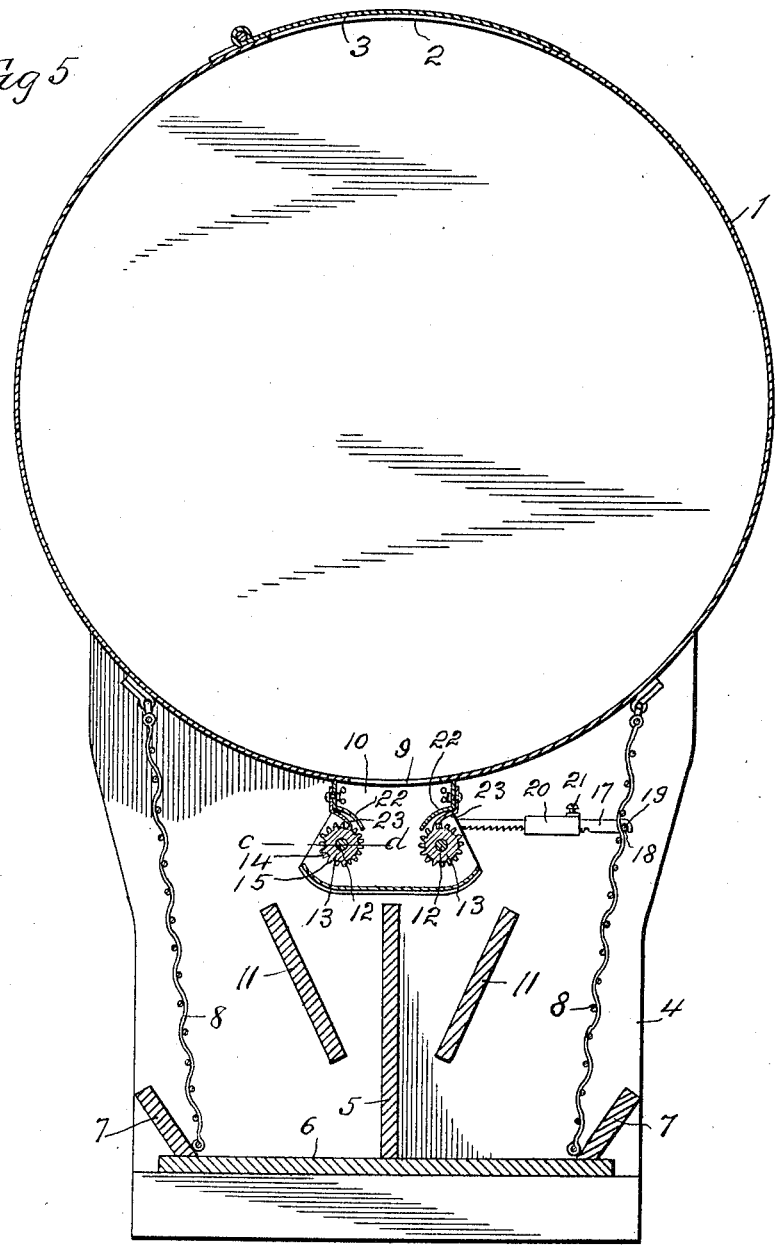

UNITED STATES PATENT OFFICE.

RAY A. WILLIAMS, OF DENVER, COLORADO.

STOCK-FEEDER.

1,036,762.  Specification of Letters Patent.  Patented Aug. 27, 1912.

Application filed October 3, 1911. Serial No. 652,568.

*To all whom it may concern:*

Be it known that I, RAY A. WILLIAMS, a citizen of the United States, residing at Denver, in the county of Arapahoe and State of Colorado, have invented a certain new and useful Improvement in Stock-Feeders, of which the following is a specification.

My invention relates to stock feeders of the type in which the animal to be fed operates the feeder.

One object of my invention is to provide a feeder which can be easily adjusted to feed different quantities of feed.

Another object of my invention is to provide a novel form of feeding device which can not easily become clogged and which will discharge the feed with regularity.

Other novel features of my invention are hereinafter fully described and claimed.

In the accompanying drawings which illustrate a preferred form of my invention, Figure 1 is an elevation of my improved feeder, portions of which are broken away. Fig. 2 is an enlarged side elevation of a portion of the operating mechanism and parts connected therewith. Fig. 3 is an enlarged cross section on the line $a$—$b$ of Fig. 4. Fig. 4 is a horizontal section, enlarged, on the line $c$—$d$ of Fig. 5. Fig. 5 is a vertical sectional view on the line $e$—$f$ of Fig. 1.

Similar reference characters designate similar parts throughout the different views.

1 designates a feed receptacle or hopper which may be of any suitable form, but which, in the drawings is shown as being a horizontal cylindrical shell provided in its upper side with an opening 2 normally closed by a hinged cover 3.

The hopper 1 is mounted upon the upper ends of vertical members 4 disposed parallel with each other and forming the sides of four feed boxes the rear sides of which are formed by two vertical members 5 disposed between the members 4 at right angles thereto and resting upon their lower edges upon a horizontal base 6 which serves as the bottoms of the four feed boxes.

Mounted on the base 6 between the end members 4 at the forward sides of the feed boxes are rearwardly and downwardly inclined members 7. The forward sides of the feed boxes above the members 7 are open to admit of an animal thrusting his head into any one of the feed boxes. In the feed boxes respectively across the open sides thereof are fenders which are movable by an animal gaining access to the feed boxes. Said fenders are preferably screen gates 8 which are hinged to the hopper 1 at their upper ends so as to be swung inwardly at their lower ends.

The lower side of the hopper 1 is provided with openings 9 through which grain held in the hopper may fall by gravity into two feed chutes 10 which are each provided with vertical parallel sides secured at their upper edges to the under side of the hopper 1 at opposite sides of the adjacent opening 9. The sides of the chutes are disposed parallel with the members 4, each chute 10 being open at opposite ends so as to discharge into two oppositely disposed feed boxes at opposite sides of one of the back members 5. In the feed boxes are respectively mounted four deflectors 11 disposed above the base 6 between the members 4 and inclining each downwardly and rearwardly toward the back member 5 which is adjacent thereto.

The deflectors 11 are disposed so as to receive upon their upper sides the feed discharged from the chutes 10, thereby serving to guide the feed to the rear parts of the feed boxes so as to require an animal to force its head to the rear of the feed box in order to obtain the feed.

Rotatively mounted in opposite side walls of the chutes 10 are four horizontal shafts 12 respectively forming parts of four force feed devices. Secured respectively to and rotative with the shafts 12 in the chutes 10 adjacent respectively to the discharge ends thereof are four feed wheels 13, each preferably provided with two sets of peripheral teeth 14 and 15, said teeth being disposed parallel with the axis of the shaft 12. The teeth of the set 14 are preferably disposed in staggered relation to the teeth 15 in order that too much or too little feed may not be discharged at each feeding operation of the wheel 13, and in order that the feed may be discharged with regularity.

Respectively secured to the shafts 12 outside the chutes 10 are ratchet wheels 16 the teeth of which are adapted to be operatively engaged by the teeth on the undersides of four rack bars 17 which rest upon the ratchet wheels 16 and which at their outer ends are provided in their under sides respectively with notches 18 which respectively have mounted therein cross wires 19 of the gate fenders 8, thereby pivotally supporting the outer ends of the rack bars so that their inner ends may swing vertically. When a gate fender 8 is moved inwardly by an animal, the rack bar 17 connected to said fender is moved inwardly thus turning the adjacent ratchet wheel 16, shaft 12 and feed wheel 13 in a direction such that feed in the chute will be forced by the wheel 13 from the chute into the adjacent feed box. When the fender 8 has been forced the limit of its movement rotation of the wheel 13 will cease. In order that the amount of feed fed upon each rearward movement of the fender 8 may be varied I have provided on the rack bars 17 respectively four longitudinally slidable sleeves 20 each having a set screw 21 adapted to bear against the adjacent rack bar 17 for securing the sleeve in the position to which it is adjusted. The sleeve 20 is adapted to be positioned so that it will strike the adjacent ratchet wheel 16 and lift from engagement therewith the rack bar 17 prior to the time the fender 8 has reached the limit of its inward movement. When the sleeve 20 strikes the ratchet wheel 16 it will slide thereupon without causing the wheel to be turned and without interfering with the free movement of the fender rearwardly to the full limit of its stroke. The sleeves 20 may thus be adjusted to permit the desired amount of feed to be fed by the wheels 13. As the fenders 8 are not interfered with in the detaching of the rack bars 17 from the ratchet wheels 16 by the sleeves 20, the animal operating the fenders can obtain most of the feed which has been discharged.

After the animal has eaten the feed which has been discharged he must withdraw his head from the feed box in order to again operate the feed mechanism, this gives another animal an opportunity to insert its head, and prevents one animal monopolizing a feed box.

As illustrated in Fig. 4 the ends of each feed wheel 13 are outwardly beveled. This prevents the feed crowding between the sides of the chute 10 and the ends of the feed wheel so as to clog the movement of the wheel and also prevents the feed from passing the wheels at its ends.

In order to prevent the weight of the feed upon the wheels 13 from clogging them and in order to insure a more perfect feeding I provide transverse guards 22 which are disposed respectively above the wheels 13 between said wheels and the openings 9 and have their upper sides convexly curved and arranged so as to guide the feed between the adjacent wheels 13.

Secured to the guards 22 respectively are spring pawls 23 which respectively engage the wheels 13 and serve to prevent retractive rotation thereof.

U shaped guiding brackets 24 may be secured to the sides of the chutes 10 for respectively guiding the rack bars 17, as is illustrated in Fig. 2.

The discharge ends of the bottoms of the chutes 10, as shown in Fig. 5 are preferably upwardly curved so that at all times there is remaining in the chutes 10 a quantity of feed. This arrangement of the discharge ends of the chutes effects a uniform discharge of the feed therefrom, and prevents a quantity of feed being accidentally discharged from the chutes if the hopper 1 is jarred.

I do not limit my invention to the structure shown and described as modifications of my invention, within the scope of the appended claims, may be made without departing from its spirit.

Having thus described my invention, what I claim and desire to secure by Letters Patent, is:—

1. In a stock feeder, a feed box, a feed chute delivering into the feed box, a force feed device for ejecting feed from the chute, a movable fender normally closing the feed box and operable by an animal gaining access to the feed box, and which must be operated in order to enable the animal to obtain access to the feed box, means actuated by the fender for operating the feed device, and adjustable means for varying the operation of said operating means.

2. In a stock feeder, a feed box, a feed chute delivering into the feed box, means for controlling discharge of feed from the chute, a movable fender normally closing the feed box and operable by an animal gaining access to the feed box, and which must be operated in order to enable the animal to obtain access to the feed box, means actuated by the fender for operating said feed controlling means, and adjustable means for varying the operation of said operating means.

3. In a stock feeder, a feed box, a feed chute delivering into the feed box, a feed device controlling discharge of feed from the chute, a movable fender operable by an animal gaining access to the feed box, means actuated by the fender for operating the feed device, and adjustable means for varying the operation of the operating means without interfering with the movement of the fender.

4. In a stock feeder, a feed box, a feed chute delivering into the feed box, a feed device controlling discharge of feed from the chute and having ratchet teeth, a fender movable by an animal gaining access to the feed box, an operating member engaging the ratchet teeth and actuated by the fender, and adjustable means for disengaging the operating member from the ratchet teeth on the feed stroke of said member.

5. In a stock feeder, a feed box, a feed chute delivering into the feed box, a feed device controlling discharge of feed from the chute and having ratchet teeth, a fender movable by an animal gaining access to the feed box, an operating member actuated by the fender for engaging the ratchet teeth to operate said device, and means adjustable lengthwise on the operating member for disengaging said member from the ratchet teeth.

6. In a stock feeder, a feed box, a feed chute delivering into the feed box, a rotary feed device for controlling discharge of feed from the chute and having ratchet teeth, a fender movable by an animal gaining access to the feed box, a rack bar actuated by the fender and engaging said ratchet teeth, and adjustable means operative on the feed stroke of said rack bar for disengaging the bar from said teeth.

7. In a stock feeder, a feed box, a feed chute delivering into the feed box, a feed device controlling discharge of feed from the chute, a fender movable by an animal gaining access to the feed box, an operating member actuated by the fender for operating the feed device, and a sleeve adjustable lengthwise on the operating member and operative on the feed stroke of said member for disengaging the operating member from the feed device.

8. In a stock feeder, a feed box, a feed chute delivering into the feed box, a rotary feed device controlling discharge of feed from the chute and having ratchet teeth, a fender movable by an animal gaining access to the feed box, a rack bar actuated by the fender and engaging said teeth for operating the feed device, and a sleeve adjustable lengthwise on the rack bar for disengaging the bar from said teeth on the feed stroke of the bar.

9. In a stock feeder, a feed box having an opening adapted to receive an animal's head, a force feed device for delivering feed into the feed box, a fender normally closing said opening for preventing access of the animal into said opening without operating the fender and operable by the animal gaining access to the feed box, and means actuated by the fender for operating the feed device.

10. In a stock feeder, a feed box having an opening adapted to receive an animal's head, a screen normally closing said opening for preventing access of the animal into the feed box through the opening without operating the screen and operable by the animal gaining access to the feed box, a device for feeding feed into the feed box, and means actuated by the screen for actuating the feed device.

In testimony whereof I have signed my name to this specification in presence of two subscribing witnesses.

RAY A. WILLIAMS.

Witnesses:
ANNA HARDER,
W. G. HENATSCH.

---

Copies of this patent may be obtained for five cents each, by addressing the "Commissioner of Patents, Washington, D. C."